No. 752,735. PATENTED FEB. 23, 1904.
W. WEISE.
RECEPTACLE.
APPLICATION FILED AUG. 4, 1903.
NO MODEL.

Witnesses:
C. H. Schining
Gustav Heyde

Inventor:—
Wilhelm Weise
by Paul D. Schilling
his attorney.

No. 752,735. Patented February 23, 1904.

UNITED STATES PATENT OFFICE.

WILHELM WEISE, OF HOHENSTEIN-ERNSTTHAL, GERMANY.

RECEPTACLE.

SPECIFICATION forming part of Letters Patent No. 752,735, dated February 23, 1904.

Application filed August 4, 1903. Serial No. 168,165. (No model.)

*To all whom it may concern:*

Be it known that I, WILHELM WEISE, a subject of the Emperor of Germany, and a resident of Hohenstein-Ernstthal, Germany, have invented certain new and useful Improvements in Receptacles, of which the following is a specification.

The subject of my invention is a closed receptacle for materials of all kinds in the form of powder, grains, or the like. By means of a handle the contents of the receptacle may be abstracted in certain definite portions, an indicator being simultaneously set in operation, whereby the number of such portions removed can be read off. The receptacle is made in two parts, the upper one having a bottom in the shape of a hopper. The exit of the latter is kept closed by a flap, slide, or the like until, by means of a handle located outside the apparatus, a measure is brought below the hopper-opening. The measure now fills automatically and is pushed aside and tipped, the hopper being closed simultaneously. Any suitable indicating device may be employed in conjunction with the slide or flap or handle.

My invention is illustrated in the accompanying sheet of drawings, in which—

Figure 1:
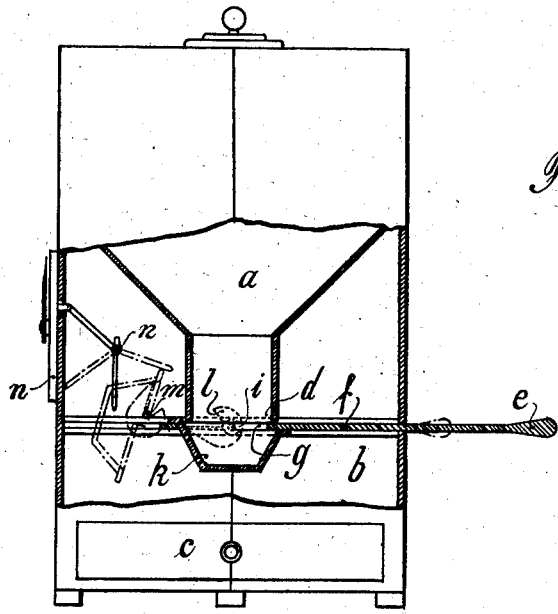
Figure 3:
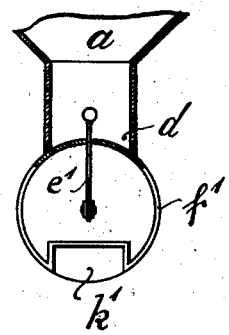
Figure 2:
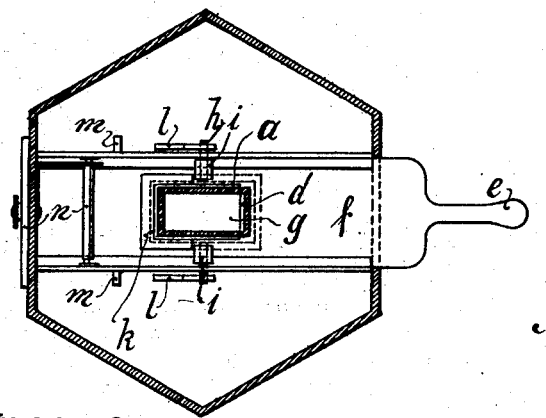

Figure 1 is an elevation of the apparatus, the central portion being drawn in section. Fig. 2 is a sectional view, and Fig. 3 represents a detail view showing the application of a rotary slide to the hopper-exit.

The receptacle consists of a hopper $a$ and a lower compartment $b$, provided with a drawer $c$. The exit $d$ of the hopper is closed by a slide, which may consist of a flat plate $f$, Fig. 1, reciprocated by means of a handle $e$. In place of a flat slide a broad ring or drum $f'$, operated by a crank $e'$, may be employed, as shown in Fig. 3. The plate $f$ is provided with an aperture $g$ below the hopper-outlet $d$, and beneath the said aperture $g$ the measure $k$ is suspended by means of trunnions $h$ in bearings $i$. The trunnions $h$ extend laterally beyond the edges of the slide-plate $f$, and each carries a cam-piece $l$, which on the slide being pushed in strikes the pin $m$. When a rotary slide $f'$, Fig. 3, is employed in place of a plate, the measure $k'$ is let into the ring or drum. In either case the measure is capable of being removed and replaced by another, or is such that its capacity can be altered by the insertion of a partition or the like. $n$ is an indicating device connected in any suitable manner with the slide or measure.

The operation of the apparatus is as follows: In the position of rest the aperture $d$ is closed by the slide $f$. If now the handle $e$ is pulled, the measure $k$ comes below the aperture $d$ and is accordingly automatically filled. The handle $e$ is now pushed in again, and the measure $k$ is thereby traveled inward and the hopper-aperture $d$ closed simultaneously. During travel of the measure the cam-pieces $l$ will strike against the stops $m$, whereby the measure tips and deposits its contents in the drawer $c$. On the handle being pulled once more the second horn of the cam-pieces $l$ will cause the measure $k$ to assume its horizontal position. In the case of a rotary slide $f'$ the latter must be turned until the measure is below, and so empties itself.

The indicating device is actuated by a catch on the slide or handle in any suitable manner and need not specially be described or shown, as it forms no essential part of my invention.

What I claim is—

A receptacle, comprising an upper compartment having an exit, and a lower compartment having a drawer, a slide closing said exit, a measure mounted on trunnions below an aperture in the slide, cam-pieces carried by the trunnions, means external of the apparatus for reciprocating said measure, and stops on the receptacle-walls coöperating with said cam-pieces to tilt the measure in its inward travel and return it to the horizontal position in its outward travel, substantially as described.

In testimony that I claim the foregoing as my invention I have signed my name in presence of two subscribing witnesses.

WILHELM WEISE.

Witnesses:
C. H. SCHILLING,
PAUL ARRAS.